United States Patent [19]

(12) United States Patent
Goodman et al.

(10) Patent No.: US 7,773,465 B2
(45) Date of Patent: Aug. 10, 2010

(54) MEDIA VAULTING IN AN AUTOMATED DATA STORAGE LIBRARY

(75) Inventors: Brian Gerard Goodman, Tucson, AZ (US); Arthur John Colvig, Tucson, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 12/139,386

(22) Filed: Jun. 13, 2008

(65) Prior Publication Data

US 2008/0235476 A1 Sep. 25, 2008

Related U.S. Application Data

(63) Continuation of application No. 10/891,567, filed on Jul. 15, 2004, now Pat. No. 7,403,451.

(51) Int. Cl.
*G11B 21/08* (2006.01)
*G06F 7/00* (2006.01)

(52) U.S. Cl. ............... 369/30.01; 369/30.38; 369/30.31; 700/213; 700/214; 700/245

(58) Field of Classification Search ............... 369/30.01, 369/30.38, 30.31, 41.1; 700/213, 214, 245; 711/163, E12.103; 710/1, 5, 10
See application file for complete search history.

(56) References Cited

U.S. PATENT DOCUMENTS

| 6,031,698 | A | 2/2000 | Bar | 360/134 |
|---|---|---|---|---|
| 6,067,481 | A | 5/2000 | Saliba et al. | 700/214 |
| 6,082,554 | A | 7/2000 | Ostwald et al. | 211/41.12 |
| 6,336,163 | B1 | 1/2002 | Brewer et al. | 711/112 |
| 6,336,172 | B1 | 1/2002 | Day, III et al. | 711/161 |
| 6,425,059 | B1 | 7/2002 | Basham et al. | 711/153 |
| 6,434,090 | B1 | 8/2002 | Basham et al. | 369/30.31 |
| 6,487,474 | B1 | 11/2002 | Goodman et al. | 700/245 |
| 6,574,641 | B1 | 6/2003 | Dawson et al. | 707/204 |
| 6,675,260 | B2 | 1/2004 | Torrey et al. | 711/114 |
| 6,725,352 | B2 | 4/2004 | Goodman et al. | 711/173 |
| 6,895,300 | B2 | 5/2005 | Goodman et al. | 700/213 |
| 7,039,726 | B2 | 5/2006 | Basham et al. | 710/1 |
| 7,289,885 | B2 | 10/2007 | Basham et al. | 700/246 |
| 7,403,451 | B2 * | 7/2008 | Goodman et al. | 369/30.01 |
| 2003/0126361 | A1 | 7/2003 | Slater et al. | 711/114 |
| 2003/0128454 | A1 | 7/2003 | Basham et al. | 360/69 |
| 2007/0127322 | A1 | 6/2007 | Anna et al. | 369/30.38 |

OTHER PUBLICATIONS

Coyne, et al., The High Performance Storage System, ACM Digital Library 1993, pp. 83-92.
Gladney, Access Control for Large Collections, ACM Transactions on Information Systems, vol. 15, No. 2, Apr. 1997, pp. 154-194.

* cited by examiner

*Primary Examiner*—Ali Neyzari

(57) ABSTRACT

Disclosed are a system, a method, and article of manufacture to provide for managing data storage media to provide secure storage of the data storage media in an automated data storage library. A logical library partition vault is created in the automated data storage library that is not accessible by any host computer. Data storage media in the logical library partition vault may only be accessed by an operator using a secure means. The logical library partition vault may comprise various components of the automated data storage library by assigning storage shelves, service bays, data storage media, data storage drives or other library components to the logical library partition vault.

40 Claims, 10 Drawing Sheets

MEDIA VAULTING IN AN AUTOMATED DATA STORAGE LIBRARY

CROSS REFERENCE TO RELATED APPLICATION

The present application is a continuation of parent application Ser. No. 10/891,567, filed Jul. 15, 2004 now U.S. Pat. No. 7,403,451.

TECHNICAL FIELD

The present invention relates to automated data storage libraries which transport portable data storage media cartridges between storage shelves and data storage drives, and, more particularly the present invention concerns a system to provide a secure location within an automated data storage library to hold data storage media while preventing unauthorized access to the media.

BACKGROUND OF THE INVENTION

Automated data storage libraries are known for providing cost effective storage and retrieval of large quantities of data. The data in automated data storage libraries are stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to, magnetic media (such as magnetic tape or disks), optical media (such as optical tape or disks), electronic media (such as PROM, EEPROM, flash PROM, MRAM, MEMS based storage, Compactflash™, Smartmedia™, Memory Stick™, etc.), or other suitable media. Typically, the data stored in automated data storage libraries is resident on data storage media that is contained within a cartridge and referred to as a data storage media cartridge, data storage cartridge, data storage media, media and cartridge. An example of a data storage media cartridge that is widely employed in automated data storage libraries for mass data storage is a magnetic tape cartridge.

In addition to data storage media, an automated data storage library also typically contains data storage drives that store data to, and/or retrieve data from, the data storage media. The transport of data storage media between data storage shelves and data storage drives is typically accomplished by one or more robot accessors (hereinafter termed "accessors"). Such accessors have grippers for physically retrieving the selected data storage media from the storage shelves within the automated data storage library and transporting such media to the data storage drives by moving in the X and Y directions.

Typically, a host system, such as a host server, communicates with the library directly or through one or more data storage drives, providing commands to the library to access particular data storage media and to move the media between the storage shelves and the data storage drives. A common feature among automated data storage libraries is the ability to partition the library into several virtual libraries, often called logical libraries. This allows the library resources to be shared between different host computers and different host applications. When a library is shared between different host computers, media security may become a problem because it may be possible for a host computer to access media assigned to another host computer. One implementation to partition automated data storage libraries into multiple logical libraries is described in U.S. Pat. No. 6,425,059. U.S. Pat. No. 6,425,059 describes logical libraries with host access to each logical library, however it does not provide for data storage media security by preventing host access to selected media. Other approaches to data storage media security typically involve security for the entire automated data storage library. For example, the library may be located in a secure room, the entire library may be locked, etc. Also, data storage media is often removed from the library and stored at another physical location outside of the library to provide data storage media security. Strict controls, procedures and restrictions must be applied to ensure that the media is not accessed by unauthorized parties. As the quantity of data storage grows, these security procedures become cumbersome, inefficient and ultimately ineffective.

SUMMARY OF THE INVENTION

The present invention provides a system, a method and an article of manufacture for managing data storage media to provide secure storage of the data storage media in an automated data storage library partition vault. The data storage media may only be accessed by a secure means.

In method form, exemplary embodiments include a method for managing data storage media in an automated data storage library. The method includes partitioning the automated data storage library into one or more logical libraries, wherein at least one the logical libraries is accessible by at least one host computer and creating a logical library partition vault in the automated data storage library that is not accessible by any host computer. Once created, one or more data storage media are placed in the logical library partition vault. Access to the logical library partition vault is restricted and access is only permitted by an operator using a secure means. The logical library partition vault may comprise various components of the automated data storage library by assigning one or more storage shelves, service bays, input/output stations, data storage media or data storage drives to the logical library partition vault.

In system embodiments the present invention provides a system for managing data storage media including at least one host computer and an automated data storage library. The data storage library includes a plurality of storage shelves for storing data storage media, at least one accessor for transporting the data storage media, and a library controller for controlling the automated data storage library. The library controller is configured to partition the automated data storage library into one or more logical libraries accessible by the at least one host computer and create a logical library partition vault in the automated data storage library that is not accessible by any host computer. The library controller is also configured to place one or more data storage media in the logical library partition vault and restrict access to the logical library partition vault. The system may further include one or more data storage drives assigned to the logical library partition vault and/or one or more input/output stations assigned to the logical library partition vault.

Further system embodiments require that only in response to a library controller verifying an access key will a door be allowed to open on the automated data storage library to permit access to the data storage media in the logical library partition vault.

These and other benefits of the present invention will be discussed in the following detailed description, which describes aspects of an exemplary system, apparatus, and procedure of the present invention. It will be appreciated by those skilled in the art that although the following detailed description will proceed with reference being made to preferred embodiments and methods of use, the present invention is not intended to be limited to these preferred embodiments and methods of use. Rather, the present invention is intended to be limited only as set forth in the accompanying claims.

For a more detailed understanding of the present invention, reference may be made to the following detailed description taken in conjunction with the accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

The present invention is described in preferred embodiments in the following description. The preferred embodiments are described with reference to the Figures. While the present invention is described in conjunction with the preferred embodiments, it will be appreciated by those skilled in the art that it is intended to cover alternatives, modifications, and equivalents as may be included within the spirit and scope of the present invention as defined by the appended claims.

Figure 1:
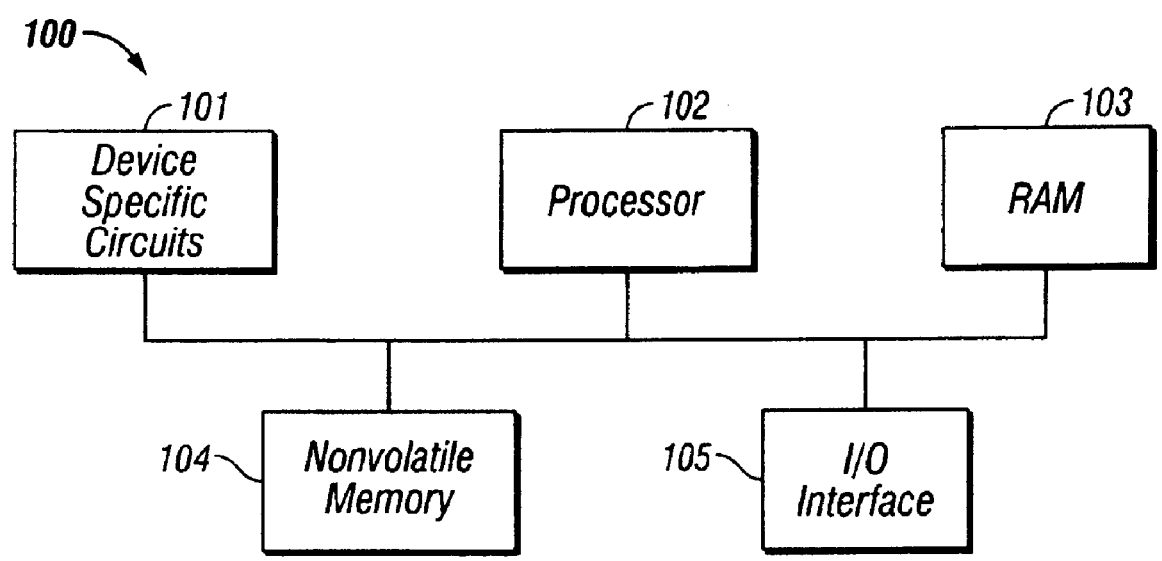
FIG. 1 is a block diagram of a library controller which may implement the method of the present invention.

An automated data storage library typically comprises one or more controllers to direct the operation of the library. The controller may take many different forms and may comprise an embedded system, a distributed control system, a personal computer, workstation, etc. FIG. 1 shows a typical library controller 100 with a processor 102, RAM (Random Access Memory) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. Processor 102 may comprise an off the shelf microprocessor, custom processor, FPGA (Field Programmable Gate Array), ASIC (Application Specific Integrated Circuit), discrete logic, etc. RAM (Random Access Memory) 103 is typically used to hold variable data, stack data, executable instructions, etc. The nonvolatile memory 104 may comprise any type of nonvolatile memory such as PROM (Programmable Read Only Memory), EEPROM (Electrically Erasable Programmable Read Only Memory), flash PROM, battery backup RAM, MRAM (Magnetoresistive Random Access Memory), MEMS (Micro-ElectroMechanical Systems) based storage, hard disk drive, etc. The nonvolatile memory 104 is typically used to hold the executable firmware and any nonvolatile data. I/O interface 105 comprises a communication interface that allows processor 102 to communicate with devices external to the controller. Examples of I/O interface 105 may comprise serial interfaces such as RS-232 or USB (Universal Serial Bus), SCSI (Small Computer Systems Interface), Fibre Channel, etc. In addition, I/O interface 105 may comprise a wireless interface such as RF or Infrared. The device specific circuits 101 provide additional hardware to enable the controller 100 to perform unique functions such as motor control of a cartridge gripper, etc. Device specific circuits 101 may, by way of example, comprise electronics that provide Pulse Width Modulation (PWM) control, Analog to Digital Conversion (ADC), Digital to Analog Conversion (DAC), etc. In addition, all or part of the device specific circuits 101 may reside outside controller 100.

Figure 2:
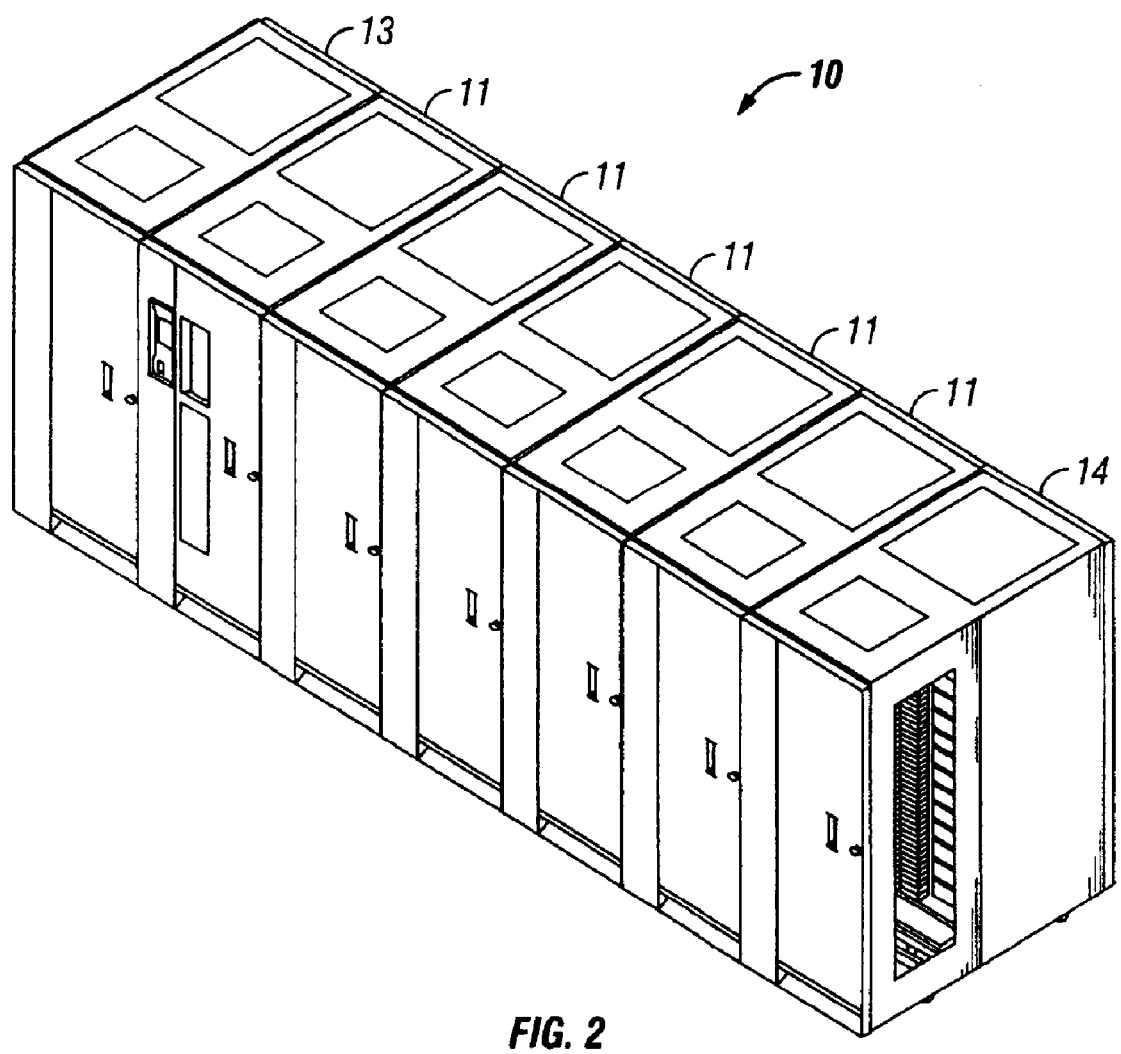
FIG. 2 illustrates an automated data storage library comprising a left hand service bay, multiple storage frames and a right hand service bay.
Figure 3:
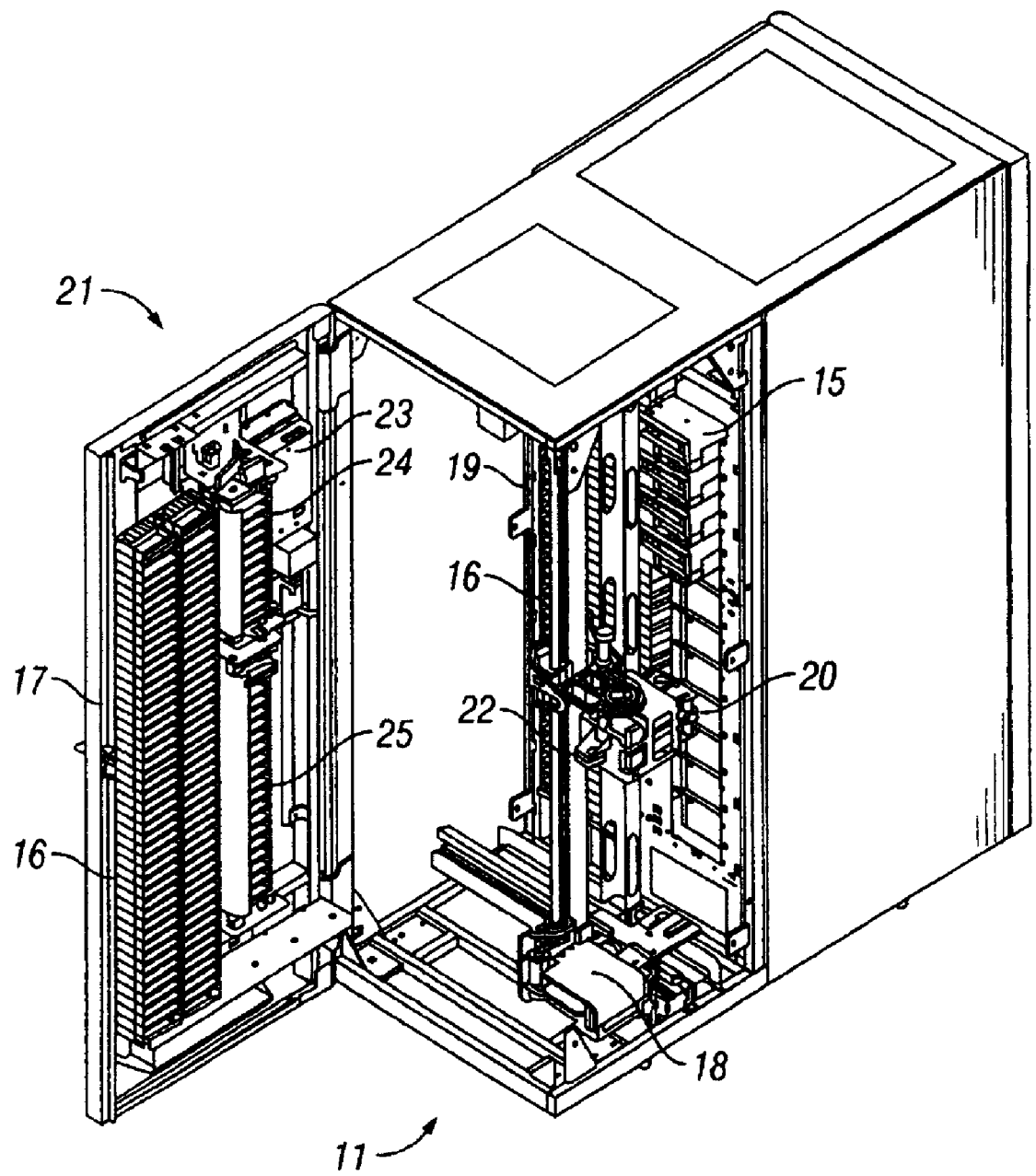
FIG. 3 illustrates a configuration of the automated data storage library of FIG. 2.

FIG. 2 illustrates an automated data storage library 10 with left hand service bay 13, one or more storage frames 11, and right hand service bay 14. As will be discussed, a frame may comprise an expansion component of the library. Frames may be added or removed to expand or reduce the size and/or functionality of the library. Frames may comprise storage shelves, drives, import/export stations, accessors, operator panels, etc. FIG. 3 shows an example of a storage frame 11, which also is the minimum configuration of the library 10 in FIG. 2. In this minimum configuration, there is no redundant accessor or service bay. The library is arranged for accessing data storage media (not shown) in response to commands from at least one external host system (not shown), and comprises a plurality of storage shelves 16, on front wall 17 and rear wall 19, for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15. It is noted that references to "data storage media" herein refer generally to both data storage cartridges and the media contained within, and for purposes herein the two terms are used interchangeably. Storage frame 11, left hand service bay 13, right hand service bay 14 or any other frames may comprise an access door, such as door 21, for accessing the inside of each frame. The access door may optionally comprise a mechanical key and lock mechanism, or may comprise an electronic lock mechanism requiring a pass code entry or the acceptance of commands from the library controller to unlock the access door to allow an operator or other person to obtain access to the inside of each library frame. The access door may be located anywhere on automated data storage library 10 (i.e. any frame, I/O station, etc.) and is used to allow internal access to automated data storage library 10. Internal access may comprise for example, an operator moving data storage media with respect to automated data storage library 10. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage shelves 16 accessible by first accessor 18. As described above, the storage frames 11 may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or reading system, such as a smart card reader, RFID tag reader or similar system, mounted on the gripper 20, to "read" and/or "write" identifying information about the data storage media, for example, to a cartridge memory.

Figure 4:
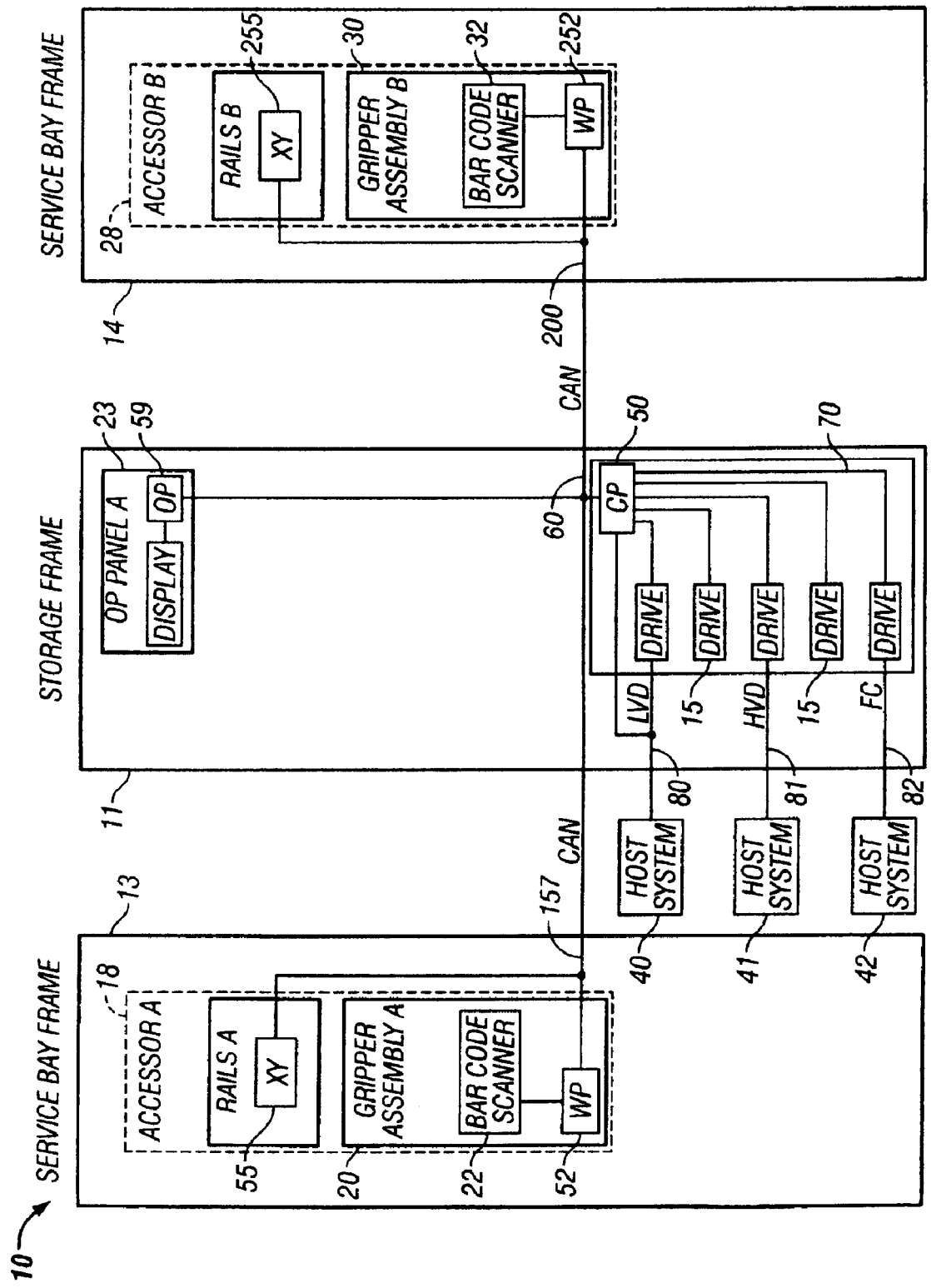
FIG. 4 illustrates an embodiment of an automated data storage library which employs a distributed system of processor nodes.

FIG. 4 illustrates an embodiment of an automated data storage library 10 of FIGS. 2 and 3, which employs a distributed system of modules with a plurality of processor nodes. An example of an automated data storage library which may implement the present invention is the IBM 3584 UltraScalable Tape Library. The library of FIG. 4 comprises one or more storage frames 11, a left hand service bay 13 and a right hand service bay 14.

The left hand service bay 13 is shown with a first accessor 18. As discussed above, the first accessor 18 comprises a gripper assembly 20 and may include a reading system 22 to "read" and/or "write" identifying information about the data storage media, for example, to a cartridge memory. The right hand service bay 14 is shown with a second accessor 28. The second accessor 28 comprises a gripper assembly 30 and may include a reading system 32 to "read" and/or "write" identifying information about the data storage media, for example, to a cartridge memory. In the event of a failure or other unavailability of the first accessor 18, or its gripper 20, etc., the second accessor 28 may perform all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14. Either or both accessors may be used for transporting the data storage media with respect to the plurality of storage shelves 16, data storage drive(s) 15, I/O stations 24-25, any library frame or anywhere within automated data storage library 10, without limitation. In addition, the present invention may operate with fewer or more than two accessors.

In the exemplary library, first accessor 18 and second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems, for example, host(s) 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 and the data storage drives 15. The commands are typically logical commands identifying the media and/or logical locations for accessing the media.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide one or more communication links 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18 and that is coupled to the communication processor node 50 via a network 60, 157. A second work processor node 252 that may be located at second accessor 28 and that is coupled to the communication processor node 50 via a network 60, 200 may also be provided. Each work processor node may respond to received commands that are broadcast to the work processor nodes from any communication processor node, and the work processor node may also direct the operation of first accessor 18, providing move commands. An XY processor node 55 may be provided and may be located at an XY system of first accessor 18. The XY processor node 55 is coupled to the network 60, 157, and is responsive to the move commands, operating the XY system to position the gripper 20. XY processor node 255 may also be provided and may be located at an XY system of second accessor 28. The XY processor node 255 is coupled to the network 60, 200, and is responsive to the move commands, operating the XY system to position the gripper 30.

Also, an operator panel processor node 59 may be provided at the optional operator panel 23 for providing an interface for communicating between the operator panel and the communication processor node 50, the work processor nodes 52, 252 and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent connections or networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the host(s) and with the data storage drives. In the example of FIG. 4, host connections 80 and 81 are SCSI busses. Bus 82 comprises an example of a Fibre Channel connection which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage shelves 16, data storage drives 15, and networks 60.

In FIG. 4 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 5:
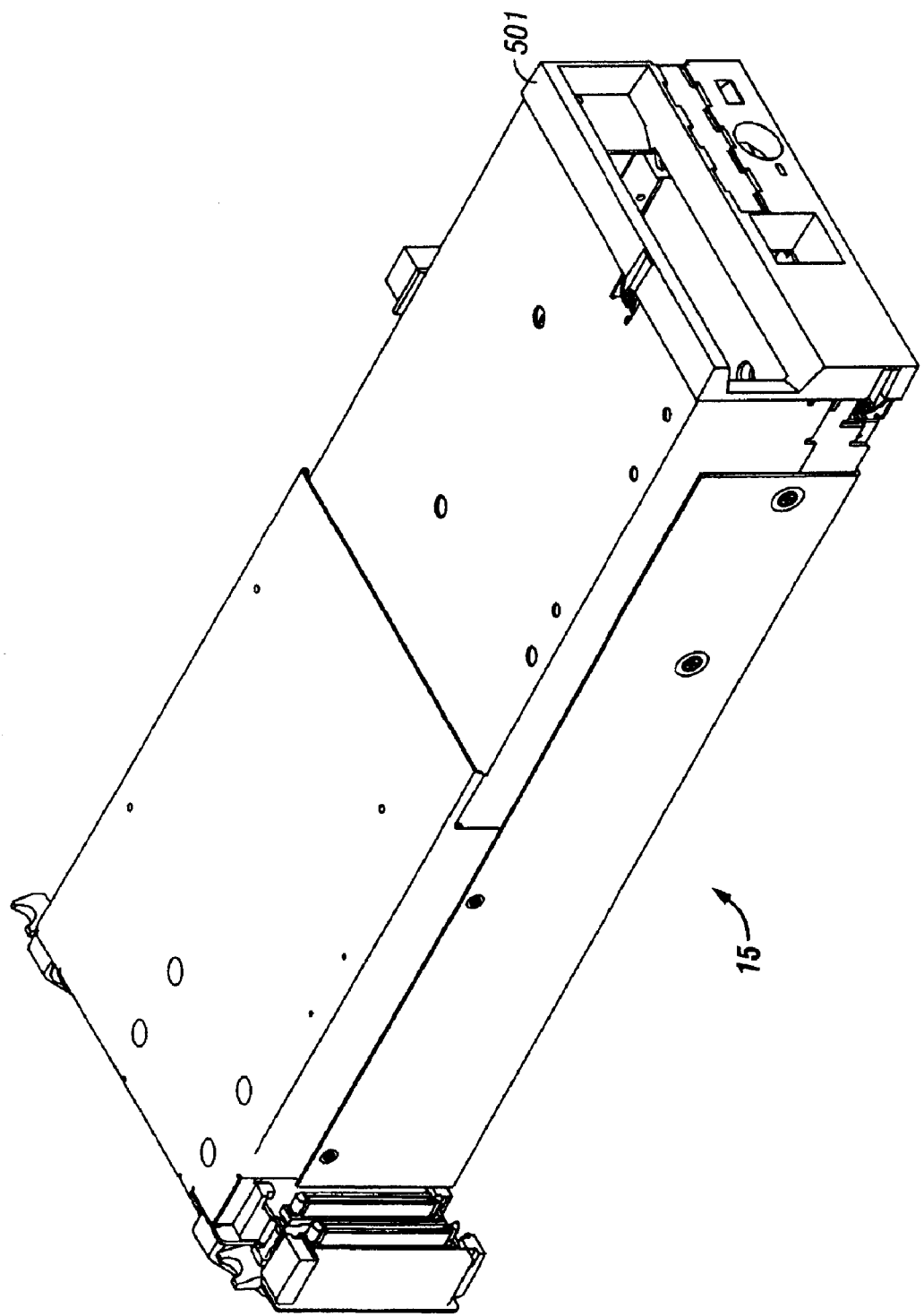
FIG. 5 illustrates a view of a data storage drive mounted in a drive canister.

FIG. 5 shows a view of the front 501 of drive 15. In this example, drive 15 is a removable media LTO (Linear Tape Open) tape drive mounted in a drive canister. The drive canister may comprise a housing to hold drive 15, mounting means to attach drive 15 to the drive canister, electrical components, interface cables, interface connectors, etc. The data storage drive of the present invention may comprise any removable media drive such as magnetic or optical tape drives, magnetic or optical disk drives, electronic media drives, or any other removable media drive as is known in the art.

Figure 10:
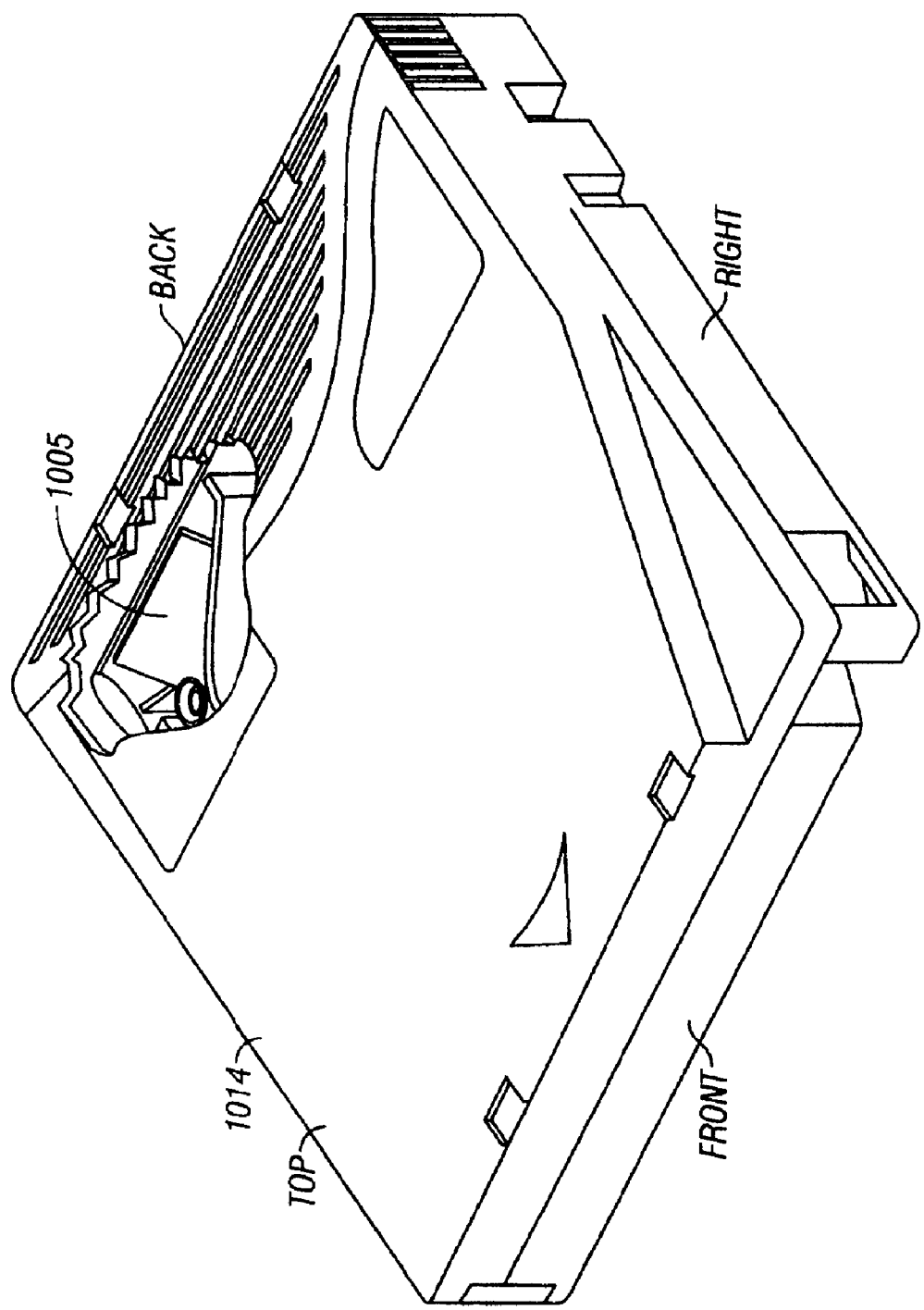
FIG. 10 illustrates removable magnetic tape data storage media for storage of data.

An example of a data cartridge that may be used with the present invention for use in drive 15 is illustrated in FIG. 10. Each data cartridge 1014, may be located in the storage shelves 16 of any of the frames of the library and may also comprise a cartridge memory 1005. The cartridge 1014 contains a storage medium, such as magnetic tape, and a cartridge shell that protects and facilitates handling of the storage medium. Some storage mediums are designed with an integrated cartridge shell, such as a Compact Disc (CD) or Digital Versatile Disc (DVD). For example, the storage medium of a Compact Disc is encased in a transparent material, such as plastic or acrylic. Storage mediums that contain an integrated cartridge shell may additionally contain another cartridge shell to protect the first cartridge shell or to simplify manual or automated handling of the data cartridge. Herein, cartridge shell and shell shall refer to any shell that holds, surrounds, encases, protects or facilitates handling of the storage medium. The cartridge memory may be associated with any of these shells. For example, the cartridge memory may be mounted inside or outside the cartridge shell of a data storage tape cartridge. As another example, the cartridge memory may be mounted inside or outside the innermost shell of a Compact Disc (CD). Alternatively, a portion of the storage medium may be used in place of the cartridge memory. The cartridge memory 1005 may contain information pertaining to the data stored on the media of the data cartridge and/or it may contain other information related to the use of the cartridge.

Figure 6:
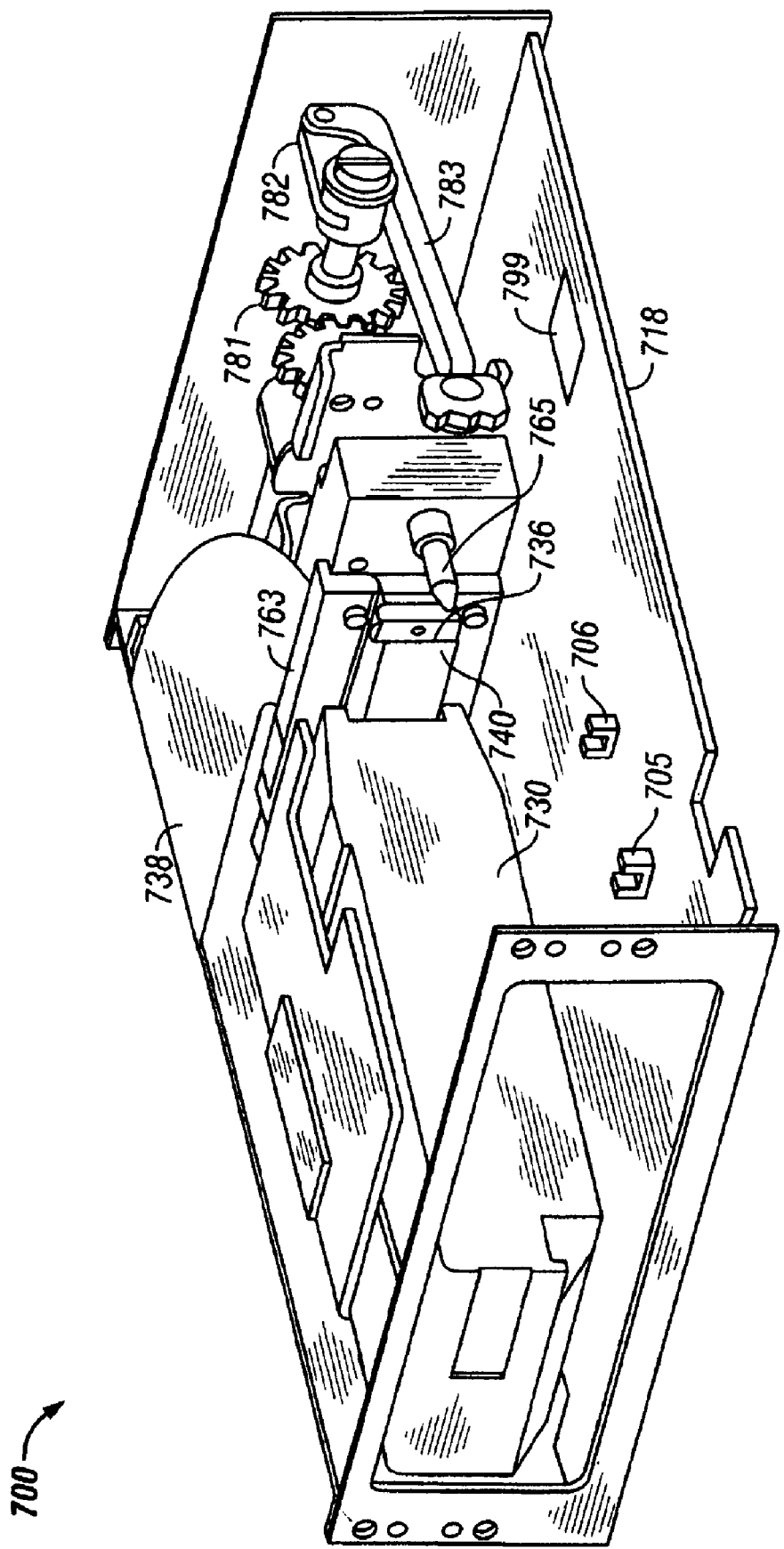
FIG. 6 illustrates a docking station which accepts a removable media.

The present invention may be used for many different types of removable storage media, for example, magnetic tape media, optical media, hard disk drive media, electronic media, etc. Herein the descriptors removable storage media, removable media cartridge, and removable media may be used interchangeably to refer to removable storage media. In one embodiment and with reference to FIG. 6, drive 15 may be implemented by docking station apparatus 700. Docking station apparatus 700 accepts removable storage media 730 (shown in FIG. 7 as a cutaway view) with the rotation of bell crank 782 by gear train 781 which pulls the compliant links 783 toward the rear of cartridge docking station apparatus 700. This motion of compliant link 783 pulls removable media cartridge 730 normal to exposed electrical connections 740 of flexible cable 738, which rest on flexible substrate 736. First, the alignment pin 765 engages a corresponding hole (not shown) in removable media cartridge 730 to orient the removable media cartridge 730 and gradually laterally align a corresponding connector on removable media cartridge 730 with exposed electrical connections 740. This action establishes power to removable media cartridge 730 and bi-directional communication between removable media cartridge 730 and docking station 700. Flexible substrate 736 is supported by stiff substrate 763. The presence of removable media 730 is detected in docking station 700 via sensors 705 and 706. Printed circuit board 718 contains nonvolatile memory 799 for the storage of firmware. Nonvolatile memory 799 is preferably a flash PROM, but may comprise any type of nonvolatile storage as is known to those of skill in the art.

Figure 7:
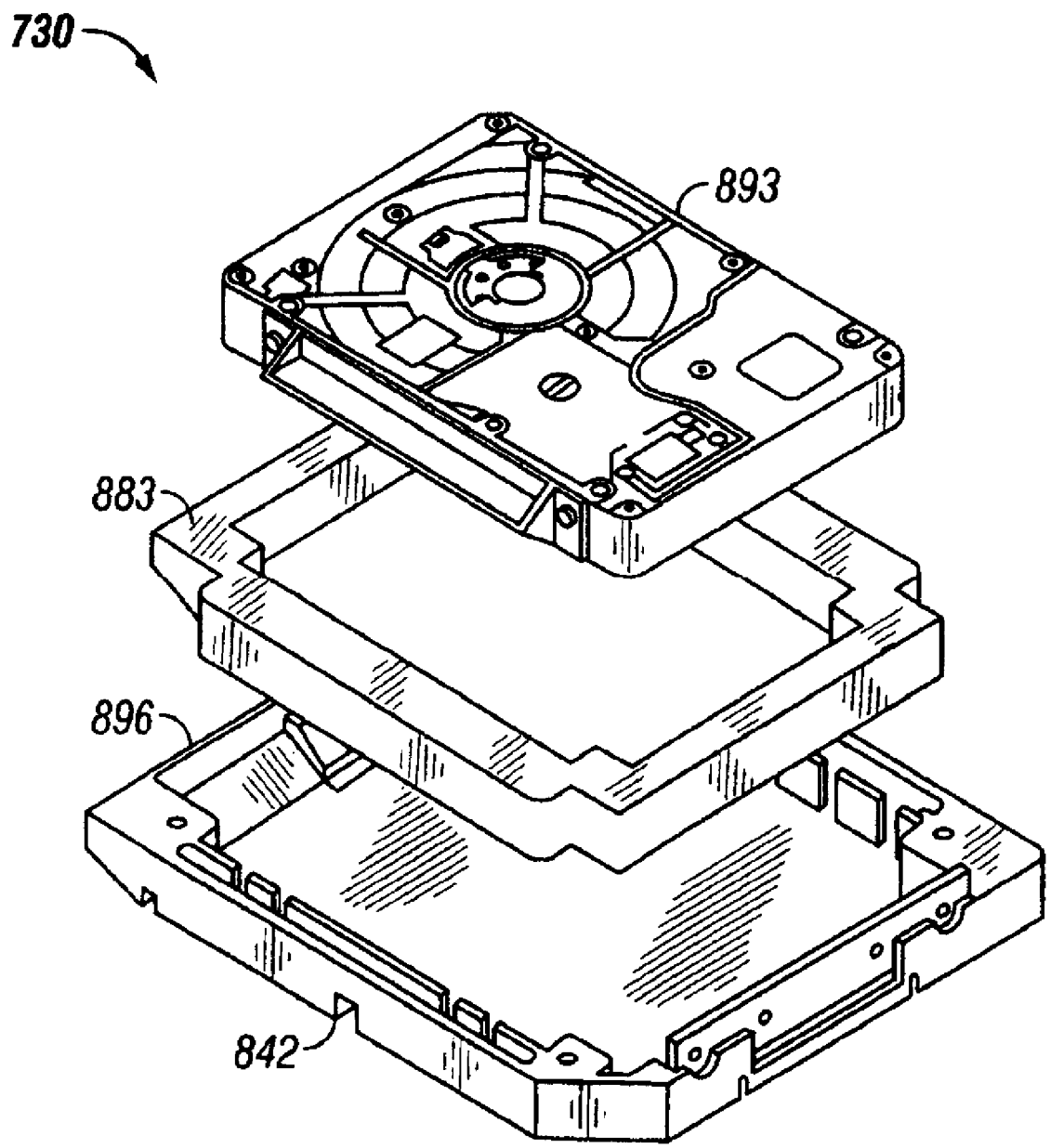
FIG. 7 illustrates removable media for storage of data.

Referring to FIG. 7, a removable media cartridge 730 is provided having a cartridge shell 896 for storing a device, such as a data storage device. Such portable cartridges have been employed for the storage of data on a length of magnetic tape. In one embodiment, an encased, self-contained magnetic disk drive assembly 893 may be mounted in such a cartridge. As discussed above, such removable media cartridges may be stored in automated data storage library 10, or handled manually. In handling the cartridges, robotic accessors, of automated data storage libraries occasionally drop a cartridge, or misplace a cartridge such that it is handled roughly, and manual handling is also likely to result in an occasional dropped or roughly handled cartridge. However, the typical data storage drive is not designed to accommodate that level of rough handling. As an example, a magnetic disk drive assembly that is available for use with a portable computer, is typically encased to prevent debris from getting into the assembly, and is preferably self-contained and operational, comprising both the necessary mechanical and electronic components. In this context, the assembly comprises at least one rotatable disk, a motor for rotating the disk(s), at least one head, an actuator and servo system for seeking and tracking, and addressing, motor control, and data handling electronics for reading and writing data, and for communicating at the data transfer interface, for example, employing an industry standard format, such as IDE, ATA, SCSI, Fibre Channel or PCI.

The height dimension, comprising the stack of heads, one or more disks, and the disk motor, is typically the most critical, such that there is no room for a support structure for the cover over the disks and heads. Any force exerted on the cover has the possibility of causing the cover to deflect inwardly such that it may contact a head or disk, destroying or causing damage to the disk drive. A breathing hole is typically provided to prevent variations in atmospheric pressure from deflecting the cover. An organic filter and a desiccant may be provided on the inside of the hole for filtering debris and contaminates. As the result, although shock absorption is necessary, the cover comprises a sensitive surface which is unable to support a shock absorbing structure. Similarly, the typical magnetic disk drive assembly has a PCB (printed circuit board) at the bottom surface, which also comprises a sensitive surface that is unable to support a shock absorbing structure without deflecting and damaging the drive. Further, such sensitive surfaces may be unable to come into contact with a shock absorbing structure without causing damage to the disk drive, and certainly would be unable to come into contact with the cartridge shell, for example, through slippage within the shock mount, without causing damage to the disk drive.

FIG. 7 comprises an exploded view of an example of removable media cartridge 730, and contains, as an example, an encased, self-contained and operational magnetic data storage drive 893. An example of an encased, self contained, magnetic data storage drive of the desired form factor to fit within the cartridge shell 896 comprises a 2.5 inch series of magnetic data storage drives. FIG. 7 illustrates the bottom half 842 of the cartridge shell 896. Optional shock absorbing foam 883 or another shock absorbing material may be used to protect drive 893 from shock and vibration, such as being accidentally dropped by an accessor of automated data storage library 10.

Although the preferred embodiment is described with reference to automated data storage library 10, drive 15, removable media cartridge 730, 1014 and docking station 700, the present invention is intended to apply to other types of data storage drives, removable media, removable media cartridges, without limitation. Also alternative data storage systems other than automated data storage library 10, for example, a VTS (Virtual Tape Server) may be used to implement the present invention.

Library controller 100 may comprise a dedicated controller of a prior art library or it may comprise a processor node of a distributed control system, such as the distributed control system depicted in FIG. 4. In addition, library controller 100 may comprise more than one processor node, such as a distributed control library that employs multiple processor nodes to accomplish library functionality. For example, in FIG. 4, library controller 100 comprises communication processor (CP) node 50, work processor (WP) node 52, XY motion processor (XY) node 55, etc. Herein, library controller may comprise a single processor or controller or it may comprise multiple processors or controllers.

Logical Library Configuration

Figure 8:
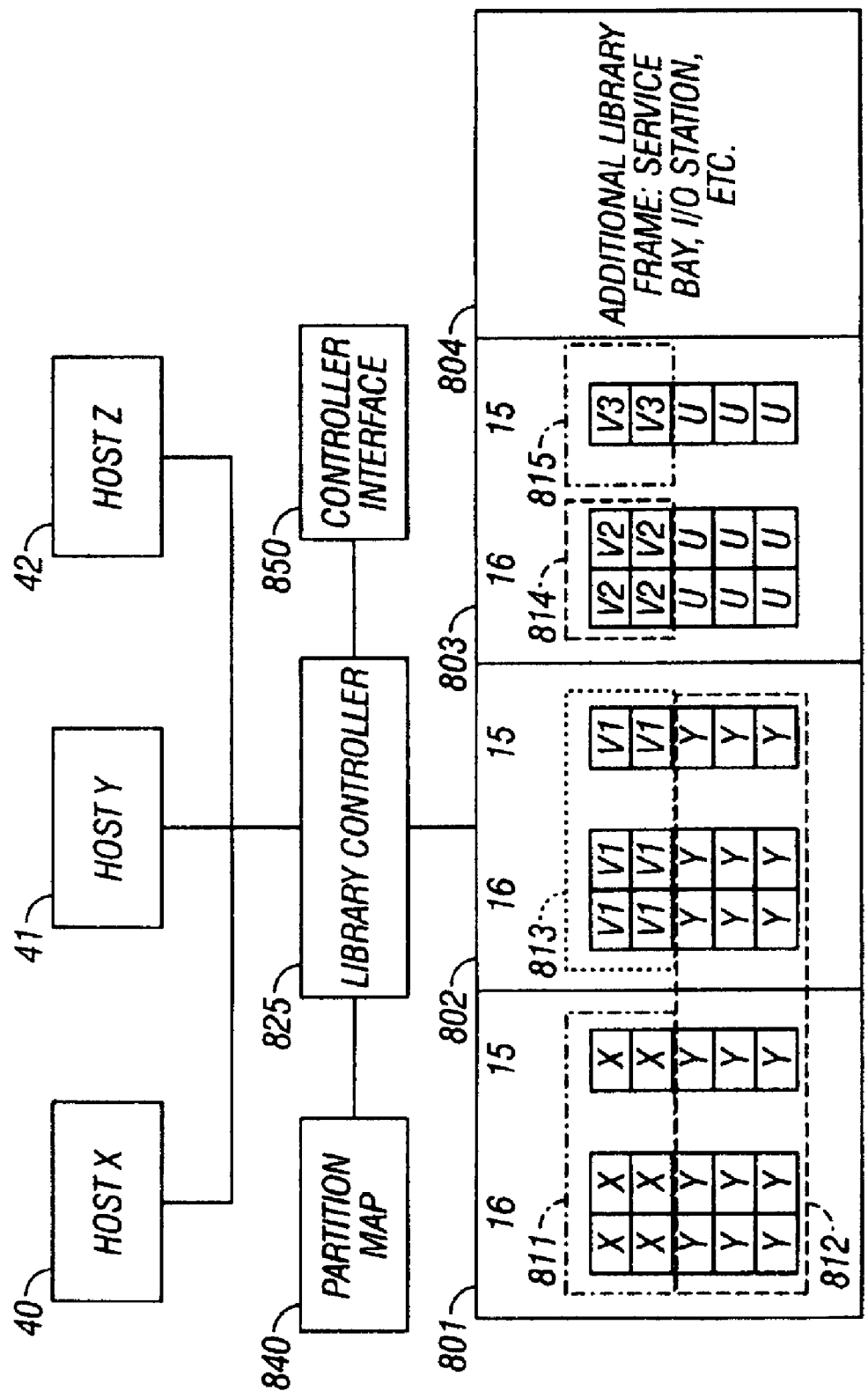
FIG. 8 illustrates a diagram showing an automated data storage library with multiple logical library and logical library partition vaults.

In the operation of the present invention (described in more detail below with reference to FIG. 9), one or more of, or portions of automated data storage library 10 and the respective drives 15, storage shelves 16, library frames, etc. may be configured as a logical library partition vault. This may be accomplished by a method described herein with reference to FIG. 8. FIG. 8 illustrates an embodiment of an automated data storage library 10, where the data storage library is composed of four library frames 801, 802, 803 and 804. The four library frames 801, 802, 803 and 804 comprises storage frames 11, and may additionally comprise one or more service bays 13, 14. The four library frames are divided into two logical library partitions 811, 812 and three logical library partition vaults 813, 814, 815. In this example, each frame 801, 802, 803, and 804 has a plurality of storage shelves 16 and drives 15. The number of storage shelves 16 and drives 15 shown in FIG. 8 is for illustration purposes only and is not intended to limit the number of storage shelves 16 or drives 15 that may be used. Library controller 825 is used to control automated data storage library 10 and is responsible for library operations, such as the movement of cartridges between storage shelves and data storage drives. Library controller 825 may be a single controller (i.e. library controller 100 shown in FIG. 1) or it may be a distributed control system, such as the distributed control system described in of FIG. 4, comprising one or more of the processor controllers 50, 52, 55 and 59. Hereafter, library controller refers to one or more processors or controllers working separately or together to provide various functions of the automated data storage library. The library controller may be located inside the automated data storage library, outside the automated data storage library, or combinations thereof. In this example, three separate host computers 40, 41 and 42 interface to the library controller 825, however, more or less than three host computers may be used. The host computers 40, 41 and 42 may connect directly to the drives 15 or they may connect to the drives indirectly through the library controller 825. Some or all of the drives that are used as partition vaults may not be connected to any host computers. The drives 15 and the cartridges contained in storage shelves 16 of the library that constitute logical library 811 are associated with host computer 40 and are labeled with "X" in FIG. 8. The drives 15 and the cartridges contained in storage shelves 16 of the library that constitute logical library 812 are associated with host computer 41 and are labeled with "Y" in FIG. 8. The drives 15 and the cartridges contained in storage shelves 16 of the library that constitute logical library partition vaults 813, 814, and 815 are labeled with "V1", "V2" and "V3" respectively. Logical library partition vaults 813, 814, and 815 are not associated with, and may not be accessed by, any host computer. For the configuration shown in FIG. 8, host computer 42 may not access any of the logical libraries or logical library partition vaults. A host not having access means that the host may not communicate in a way that alters the operation of the any of the logical libraries or logical library partition vaults. The drives 15 and the cartridges contained in storage shelves 16 of the library that are not associated with any host computer or any partition vault are labeled with "U", and may be associated with any of the three host computers 40, 41 and 42 or may be configured into logical library partition vaults during a library configuration operation for example. This embodiment illustrated in FIG. 8 is not meant to limit the use of the present invention to this example and one of ordinary skill in the art having the benefit of the present invention disclosed herein will recognize that the configuration, the layout, the number of host computers and number of components may vary from that illustrated in FIG. 8 and described herein.

The logical library partitions and/or logical library partition vaults may be configured when the library 100 is initially installed, subsequently reconfigured, or otherwise setup. The logical library partitions and logical library partition vaults, illustrated in FIG. 8 for example, may be configured by a library operator using controller interface 850. Controller interface 850 may comprise an operator panel 23, web user interface, remote computer, etc. In a preferred embodiment, controller interface 850 provides secure access to library controller 825. A secure access or secure means may comprise an access key, such as a key device, password, user name and password, security code, or any other method of security control or authentication as is known to those of skill in the art. The key device may comprise a mechanical key/lock system, electronic key/lock, RFID tag key/lock system, optical key/lock, retina recognition, fingerprint identification, etc. Alternatively, the secure access may be provided to library controller 825 through a component of library controller 825, by another component of the library, or by a remote computer or component coupled to, or associated with, the library controller 825. The storage shelves 16 are logically allocated into partitions (also called "logical libraries"). As an example, storage shelves 16 may be logically allocated into partitions by an operator transmitting input data to the controller 825 via a keyboard or library control panel (i.e. operator panel 23). This input data specifies the extent of each partition, and as an example, may identify, for example: the number of partitions; the storage shelves 16 contained in each logical library partition and/or logical library partition vault; the data storage media contained in each logical library partition and/or logical library partition vault; the drives 15 contained in each logical library partition and/or logical library partition vault; and/or the host computer(s) associated with each logical library partition. No host computer may be associated with or have access to any logical library partition vault(s). Additional library components may be assigned as logical library partition vaults, for example, magazines, service bays, I/O stations, library frames, etc.

Assignment of library components to each logical library partition and/or logical library partition vault comprises a logical allocation or dedication of the particular component for use by the respective partition. After assigning drives, storage shelves and/or data storage media, and library components to the respective logical library partition, library controller 825 conducts host-partition matching. This may be performed, for example, by associating certain host inputs (e.g. 80, 81, 82 of FIG. 4) to certain logical libraries. The host inputs associate one or more hosts with each logical library partition; each host associated with a partition is said to have "access rights" to the facilities of that partition. Access rights are used to refer to the ability of a host to direct the operation of elements within or related to the facilities of that partition. If desired, a host may have access rights to more than one partition and each partition may have more that one host associated with it. Library controller 825 stores the host-partition mapping in the partition map 840. The partition map may comprise a listing of the assignments of the drives 15, storage shelves 16 and/or data storage media, library frames, I/O stations, etc. that comprise, for example partitions 811-815 illustrated in FIG. 8. The partition may be in the form of a lookup table or other format that is effectively used by library controller 825 to respond to commands with respect to the partitions. When partition map 840 is complete, the initial configuration of the library is finished. The vault area may be a logical relationship or a physical relationship. An example of a physical vault may comprise a storage shelf that is dedicated to a partition vault. In this example, a cartridge that resides in the storage shelf is considered to be in the partition vault. An example of a logical vault may comprise a particular cartridge that has been associated with the partition vault. In this example, a cartridge may be logically placed in the vault by maintaining an inventory (i.e. by library controller 825 and/or partition map 840) of a media identifier associated with the cartridge, such as a bar code label or cartridge memory serial number. Herein, partition vault may comprise a logical vault and/or a physical vault and placing includes physical placement, logical placement or assignment of the media.

In the above description for configuring automated data storage library 10 into logical library partitions and/or logical library partition vaults, various examples were given for the library components that may be used for the logical library partition vaults. Some examples of possible configurations are discussed below to further illustrate configurations of automated data storage library 10 that may result from the use of the present invention.

In a first example of a logical library partition vault of automated data storage library 10, logical library partition vaults do not have any association to drives or host computers. Association of a logical library partition vault with a drive or host computer means that the drive or host computer is logically or physically part of the partition vault. While in the partition vault, the data on the data storage media cannot be accessed by any host computer and it cannot be accessed by any operator that does not have secure access. An operator, with the proper secure access security level, could move media between a vault and any other area of the library. This access may be in the form of a key to a library door or it may be in the form of secure access to a library interface such as a web user interface or an operator panel. This embodiment allows media to be stored in a secure manner until it is needed at some future date. Media in a vault area could be invisible to a host computer. Alternatively, other controls may be employed to prevent host access to the media in a vault area. For example, the standard SCSI read element status data "access field" could be used to prevent host access. In one embodiment, library export operations could result in media being moved to a vault area rather than to an I/O station. A data storage media management policy may be employed to direct selected cartridges to the vault upon receipt of an export command.

In a second example, a data storage drive (i.e., drive 15, docking station apparatus 700) may be associated with a partition vault to allow the partition vault to be used to access media in a special manner. For example, the partition vault could be free from any host control path such that the drives within the partition vault operate as stand-alone drives. Media could be moved into the drives through operator control, through some form of scheduling, through an interface other than a standard control path interface, etc. This would allow stand-alone access to the data storage media without removing the media from the library, thus avoiding a potential security risk.

In a third example, a data storage drive (i.e., drive 15, docking station apparatus 700) is used as a more secure vault than a storage shelf, resulting in a more secure "drive vault". A drive vault may comprise an ordinary drive, a special purpose drive or a reduced function drive. In one example of a reduced function drive, significant cost may be removed from the drive to produce a drive with a primary capability to hold media in a secure manner. Library controller 825, could instruct the drive vault to ignore any attempted host communication and it could instruct the drive vault to ignore any attempt to eject the media. The instructions from library controller 825 to the drive vault could comprise secure communication between the library and drive vault. In addition, encryption keys or other security mechanisms could be used instruct the drive vault to release media that has been placed in the drive vault. This example allows media to be stored in a secure manner until it is needed at some future date.

In a fourth example, one or more I/O stations (i.e., upper I/O station 24 and/or lower I/O station 25) may be used as a data cartridge vault. The I/O station may have a library controlled lock to prevent exterior access to the cartridges in the I/O station and/or a library controlled internal cartridge lock.

In a fifth example, a library service bay may be used as a vault area. The service bay may contain storage cells, drives, reduced function drives, I/O stations, etc. Any or all of these areas within the service bay may be used to hold data storage media in the service bay vault. This provides an advantage for a dual-accessor configuration of an automated data storage library where a service bay is not ordinarily used to hold data storage media (i.e. removable storage media 730, 1014) because a failure of one accessor could result in the data storage media becoming inaccessible by the other accessor. As a vault, it may be acceptable to have such a risk.

For any embodiment of a partition vault, the library could track vault items and report an error when the vault has changed or has been tampered with. This would provide additional security for an operator that may open a library door and remove data storage media from the vault area. In addition, media within the vault could be tracked through a media identifier such as a label on the cartridge, an identifier in a cartridge memory such as a cartridge serial number, or through an identifier on the data storage medium itself. The reporting of vault tampering may occur over any existing interface such as a web user interface, operator panel, SNMP (Simple Network Management Protocol), call-home operation, etc.

Operation

Figure 9:
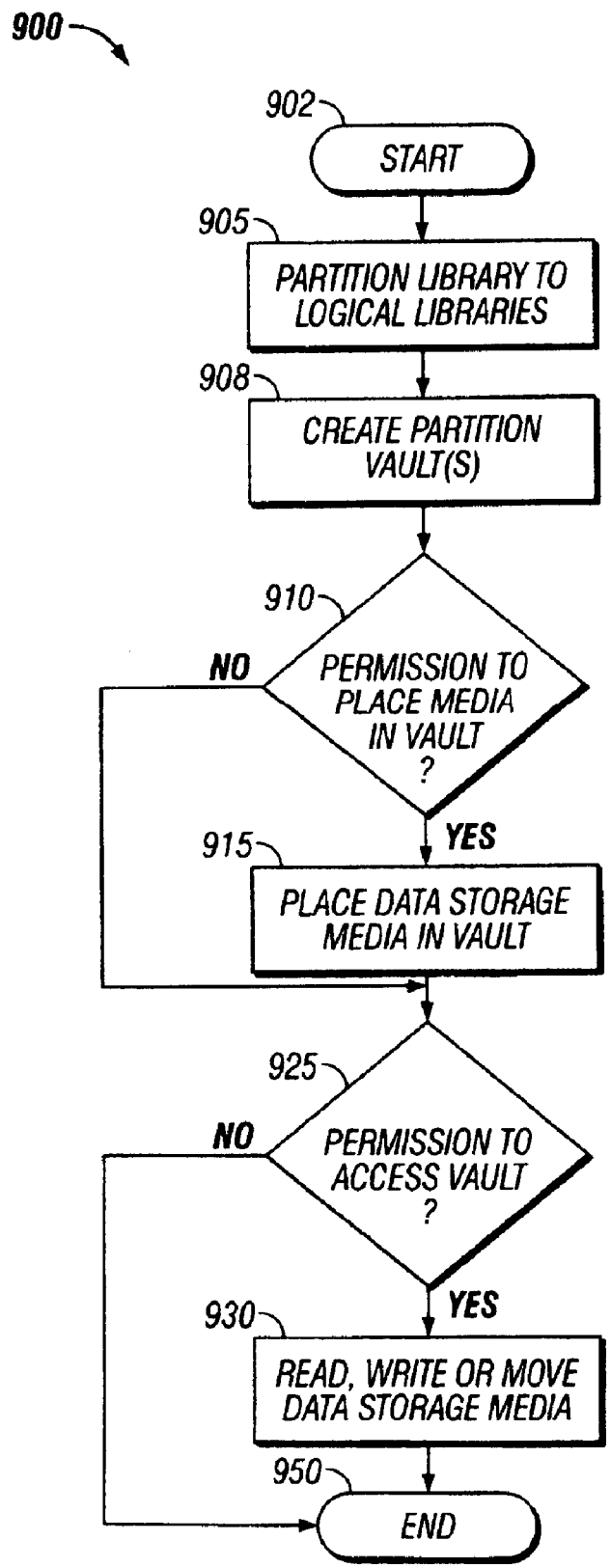
FIG. 9 illustrates a flowchart showing a process to implement an embodiment of the present invention.

FIG. 9 shows flowchart 900 of a process for the operation of one embodiment of the present invention. The process begins at step 902 flowing to step 905. At step 905, automated data storage library 10 is partitioned into one or more logical libraries, wherein at least one of the logical libraries is accessible by at least one host computer. For example, automated data storage library 10 may be partitioned into logical libraries 811 and 812 as shown in FIG. 8 by using the procedure described above with reference to FIG. 8. It should be noted that the present invention does not require library partitioning and partitioning the library into one partition, or logical library, is equivalent to an unpartitioned library. After partitioning automated data storage library 10 into one or more logical libraries at step 905, control flows to step 908. At step 908, a logical library partition vault that is not accessible by any host computer is created in the automated data storage library. The term logical library partition vault is used for descriptive purposes only and is not meant to limit the present invention to library partitioning. In addition, logical library partition vault, partition vault, drive vault, and vault, all refer to a secure means of holding data storage media. The logical library partition vault may be created by the process described above with reference to FIG. 8. The created logical library partition vault(s) may be comprised of all or a part of automated data storage library 10. Alternatively, the created logical library partition vault(s) may be comprised of one or more cartridge maps, where data storage media is logically placed in a vault, with no specific physical vault area. The cartridge map provides an association between a particular cartridge and a particular logical library partition vault. As an example, the cartridge map may comprise a table with one entry for each cartridge that is to be associated with the logical library partition vault. The table entry may identify the particular cartridge by using a cartridge identifier such as a value associated with a cartridge bar code label, a value associated with a cartridge memory location, a value associated with a data storage medium location, etc. There may be a table for each logical library partition vault or there may be another table entry, for each cartridge, that identifies the associated logical library partition vault. In one embodiment, one or more storage shelves 16 may be assigned to the logical library partition vault. Library controller 825 is configured to process data storage media stored in the assigned storage shelves in a manner such that the data storage media is considered inside and protected by the logical library partition vault, thus preventing unauthorized access to the media. In another embodiment, data storage media may be assigned to the logical library partition vault. Library controller 825 is configured to process data storage media, based on identifying information associated with the media, in a manner such that the data storage media is considered inside and protected by the logical library partition vault, thus preventing unauthorized access to the media. For example, cartridge memory 1005 (see FIG. 10) may be used to store assignment information that links a particular data storage media to a logical library partition vault. In another example, an identifier associated with the media may be used by library controller 825 to associate a particular media with a partition vault. The identifier may comprise an identifier in cartridge memory 1005 or a bar code label on the media, for example. The library controller 825 may use a bar code scanner 22 or other reading system to read the identifier associated with the data storage media. Upon reading the identifier and comparing it to any library association tables (i.e. by library controller 825 and/or partition map 840), the assignment of a particular data storage media can be determined and used to prevent unauthorized access. As described above, the logical library partition vault may be a physical or logical assignment or a combination thereof. Depending upon the nature of the assignment when the logical library partition vault is created or later modified, the physical location of the logical library partition vault and/or the contents of the logical library partition vault are not accessible by any host computer. In another embodiment, a service bay may be assigned to the logical library partition vault to provide a secure location for the data storage media. For example, all or part of left hand service bay 13 and/or right hand service bay 14 illustrated in FIG. 2 may be assigned to the logical library partition vault. In another embodiment, one or more data storage drive(s) 15 may be assigned to the logical library partition vault. For example, any media located in drive 15 may be considered to be in the partition vault. In another example, drive 15 may comprise docking station apparatus 700 as described above with reference to FIG. 6. Drives may be associated with a partition vault to allow the data stored on the media to be accessed in a special manner. For example, the partition vault could be free from any host control path such that the drives within the partition vault are accessed as stand-alone drives. Data storage media could be moved into the drives through operator control, through some form of scheduling, through an interface other than a standard host control path interface, etc. This would allow stand-alone access to the data storage media without removing the media from the library. Herein, operator refers to a library administrator, user, owner, or any other human that may operate or use the library. Data storage media may be placed in at least one of the data storage drives to provide a secure location for the data storage media. Access to the data storage media placed in the data storage drive could be protected by restricting movement of the media from the data storage drive or by ejecting the data storage media from the data storage drives only if secure access to the data storage drives is verified. As described above, secure access may comprise verifying a user name and password at an operator interface to the automated data storage library, for example by use of operator panel 23.

In another embodiment the drive 15 may comprise a reduced function drive constructed with enough capability to load and unload media, or otherwise lock media within the drive. The reduced function drive would function as a drive vault and may have other capabilities compared to the drives typically used in the automated data storage library, such as read only capability. The cost of the reduced function drive may be much less than a full function drive. The drive vault may comprise an ordinary drive or it may comprise a special purpose drive. With any or all embodiments of drive vault, library controller 825 may be programmed to instruct the drive vault to ignore any attempted host communication or any attempt to eject the media. The instructions from the library controller to the drive vault could comprise ordinary library/drive communications, or may comprise secure communication between the library and drive vault. In addition, encryption keys or other security mechanisms could be used instruct the drive vault to eject media that has been placed in the drive vault.

In yet another embodiment, the logical library partition vault may be created by assigning one or more input/output stations to the logical library partition vault. The I/O station(s) (i.e. upper I/O station 24 and/or lower I/O station 25) may have a library controlled lock to prevent exterior access to the cartridges in the I/O station and there may even be a library controlled internal cartridge lock to prevent interior access to the cartridges in the I/O station.

After execution of step 908, control flows to optional step 910. At optional step 910 permission to place media in a logical library partition vault is determined. If permission to place media is not granted at step 910, then control flows to step 925. If permission to place media is granted at step 910, then control flows to step 915 to place the media in the logical library partition vault. Steps 910 and 915 may be accomplished by various means. For example, library controller 825 may only allow data storage media to be placed in the logical library partition vault after verifying an access key. Alternatively, library controller 825 may allow data storage media to be placed in the logical library partition vault anytime after a logical library partition vault is created. In this case, there would be no step 910. Various techniques may also be used at step 915 where the data storage media is placed in the logical library partition vault. Placing the data storage media in the logical library partition vault may be accomplished by library controller 825 providing commands, or direct motion control, to one or more accessors (i.e. first accessor 18 and/or second accessor 28) to move data storage media to the logical library partition vault. The initial location of the data storage media may be anywhere inside the library, for example, an operator may place data storage media in upper I/O station 24 and/or lower I/O station 25, where either accessor may grip the data storage media and move it to the logical library partition vault. In another example, the media may be associated with a particular logical library and an operator may use an interface of the library to move the cartridge to the partition vault. The interface may comprise an operator panel, web user interface, etc. The media movement from a logical library partition to the partition vault may comprise a physical movement of the data storage media or it may comprise a logical movement where the data storage media is assigned to, or associated with, the partition vault. Herein, placing data storage media in the partition vault may comprise a logical operation, such as an association between the data storage media and a partition vault, and may not involve any actual movement of the cartridge. Alternatively, to gain permission to place the media in the logical library partition vault, an operator may insert a key in a door lock, enter a pass code in an electronic locking device or use other physical lock and key mechanisms to open a library door (i.e. door 21 of automated data storage library 10) and physically place data storage media in the logical library partition vault. For example, in response to entering a key in a locked door of the automated data storage library, the lock mechanism may allow the door to open to permit one or more data storage media to be placed in the logical library partition vault.

After execution of step 915, control flows to step 925. Step 925 is executed in response to a request to access data storage media in the logical library partition vault. Execution of step 925 results in restricting access to the logical library partition vault by permitting access to the logical library partition vault only by a secure means. If access to the logical library partition vault is not permitted then control flows to step 950 to end the process. If access to the logical library partition vault is permitted then control flows to step 930 to access the data storage media in the logical library partition vault. Various embodiments of a secure means may be employed. For example, execution of steps 925 and 930 may be accomplished by requiring that only in response to a library controller verifying an access key, directing an accessor to move data storage media placed in the logical library partition vault. An operator interface coupled to the library controller may be used to input a secure user name and password to library controller 825. The operator interface may comprise: operator panel 23, a web user interface, a management interface, a remote computer, etc. A secure means may further comprise library controller 825 being configured to prevent any host computer from directing an accessor to move the data storage media associated with a vault. In one example, the library controller could ignore or fail any attempted host movement of data storage media associated with the vault. In another example, library controller could be configured to hide the contents of the vault from any host view. To further illustrate this example, the SCSI Read Element Status command is commonly used by hosts to obtain a view of the library contents. The contents of the vault could be omitted from the read element status data such that the host has no awareness that the contents of the vault exist. In another example of a secure means, execution of steps 925 and 930 may be accomplished by requiring that only in response to a library controller verifying an access key, allowing a door to be opened on the automated data storage library to permit access to the data storage media placed in the logical library partition vault. This could be accomplished by a door lock that is activated by the library controller. Library controller 825 could send commands or signals to the door lock mechanism to unlock the door (i.e. door 21 of automated data storage library 10) after verifying a secure user name and password and receiving instruction from an operator, a host computer, or interface device to unlock the library door. Still further, execution of steps 925 and 930 may also be accomplished by requiring that in response to entering a key in a locked door of the automated data storage library, allowing the door to open to permit access to the data storage media placed in the logical library partition vault. To accomplish this, an operator may insert a key in a door lock, enter a pass code in an electronic locking device, or use other physical lock and key mechanisms to unlock a library door, (i.e. door 21 of automated data storage library 10) and physically removing data storage media from the logical library partition vault. Accessing the data storage media at step 930 may comprise moving the data storage media, removing the data storage media, reading the data storage media, writing the data storage media, etc. For example if the logical library partition vault comprises a storage location (i.e. storage shelves 16, upper I/O station 24 and/or lower I/O station 25, etc.) that does not comprise a data storage drive, then the data storage media may be moved to another location to read/write data with respect to the data storage media. In another example, if the logical library partition vault comprises a data storage drive (i.e. drive 15, docking station apparatus 700, etc.) then access to the data storage media may comprise reading or writing data with respect to the data storage media, ejecting the data storage media, or other operations to make the data storage media available for access. Still further, the media may be moved within the vault or it may be moved between the vault and another area of the library, such as a logical library partition. After accessing the data storage media, control flows to step 950 where the process ends.

The foregoing description, for purposes of explanation, used specific nomenclature to provide a thorough understanding of the present invention. However, it will be apparent to one skilled in the art that the specific details are not required in order to practice the present invention. In other instances, well known circuits and devices are shown in block diagram form in order to avoid unnecessary distraction from the present invention. Thus, the foregoing descriptions of specific embodiments of the present invention are presented for purposes of illustration and description. They are not intended to be exhaustive or to limit the present invention to the precise forms disclosed. Obviously many modifications and variations are possible in view of the above teachings.

The present invention disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, MRAMs, MEMS based memory, microcode, programmable logic, etc.). Code in the computer readable medium is accessed and executed by one or more processors. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic of FIGS. 8 and 9 describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The logic of FIGS. 8 and 9 was described as being implemented in software. This logic may be part of the operating system of the host systems or an application program. In yet further implementations, this logic may be maintained in storage areas managed by the control units or in a read only memory or other hardwired type of device. The preferred logic may be implemented in hard disk drives or in programmable and non-programmable gate array logic.

The embodiments were chosen and described in order to best explain the principles of the present invention and its practical applications, to thereby enable others skilled in the art to best utilize the present invention and various embodiments with various modifications as are suited to the particular use contemplated. It is intended that the scope of the present invention be defined by the following claims and their equivalents.

What is claimed is:

1. An automated data storage library comprising:
   a plurality of storage shelves for storing data storage media;
   at least one accessor for transporting said data storage media;
   a library controller for controlling said automated data storage library, said library controller is configured to:
      partition said automated data storage library into one or more logical libraries, wherein at least one of said one or more logical libraries is accessible by at least one host computer;
      create a logical library partition vault in said automated data storage library that is not accessible by any host computer;
      place one or more of said data storage media in said logical library partition vault; and
      restrict access to said logical library partition vault.

2. The automated data storage library of claim 1, wherein said library controller is further configured to:
   assign one or more cartridge maps to said logical library partition vault.

3. The automated data storage library of claim 1, wherein said library controller is further configured to:
   assign one or more of said storage shelves to said logical library partition vault.

4. The automated data storage library of claim 1, further comprising a service bay and wherein said library controller is further configured to:
   assign said service bay to said logical library partition vault.

5. The automated data storage library of claim 1, further comprising one or more data storage drives and wherein said library controller is further configured to:
   assign said one or more data storage drives to said logical library partition vault.

6. The automated data storage library of claim 1, further comprising one or more data storage drives and wherein said library controller is further configured to:
   assign said one or more data storage drives to said logical library partition vault;
   place at least one of said one or more data storage media in at least one of said one or more data storage drives; and
   eject said at least one of said one or more data storage media from said at least one of said one or more data storage drives only if secure access to said one or more data storage drives is verified.

7. The automated data storage library of claim 1, further comprising one or more reduced function data storage drives and wherein said library controller is further configured to:
   assign said one or more reduced function data storage drives to said logical library partition vault.

8. The automated data storage library of claim 1, further comprising one or more input/output stations and wherein said library controller is further configured to:
   assign said one or more input/output stations to said logical library partition vault.

9. The automated data storage library of claim 1, wherein said library controller is further configured to:
   only in response to said library controller verifying an access key, allowing said data storage media to be placed in said logical library partition vault.

10. The automated data storage library of claim 1, wherein said library controller is further configured to:
    prevent any host computer from directing said accessor to move said data storage media placed in said logical library partition vault.

11. The automated data storage library of claim 1, wherein said library controller is further configured to:

only in response to said library controller verifying an access key, directing said accessor to move said one or more data storage media placed in said logical library partition vault.

12. The automated data storage library of claim 1, further comprising at least one door to allow internal access to said automated data storage library and wherein said library controller is further configured to:
only in response to a library controller verifying an access key, allowing said door to be opened on said automated data storage library to permit access to said one or more data storage media placed in said logical library partition vault.

13. The automated data storage library of claim 1, further comprising at least one door to allow internal access to said automated data storage library and wherein in response to entering a key in a locked door of said automated data storage library, allowing said door to open to permit access to said one or more data storage media placed in said logical library partition vault.

14. A system for managing data storage media, comprising:
at least one host computer;
an automated data storage library comprising:
a plurality of storage shelves for storing data storage media;
at least one accessor for transporting said data storage media;
a library controller for controlling said automated data storage library, said library controller is configured to:
partition said automated data storage library into one or more logical libraries, wherein at least one of said one or more logical libraries is accessible by said at least one host computer;
create a logical library partition vault in said automated data storage library that is not accessible by any host computer;
place one or more of said data storage media in said logical library partition vault; and
restrict access to said logical library partition vault.

15. The system of claim 14, wherein said library controller is further configured to:
assign one or more cartridge maps to said logical library partition vault.

16. The system of claim 14, wherein said library controller is further configured to:
assign one or more of said storage shelves to said logical library partition vault.

17. The system of claim 14, further comprising one or more data storage drives and wherein said library controller is further configured to:
assign said one or more data storage drives to said logical library partition vault.

18. The system of claim 14, further comprising one or more input/output stations and wherein said library controller is further configured to:
assign said one or more input/output stations to said logical library partition vault.

19. The system of claim 14, wherein said library controller is further configured to:
only in response to said library controller verifying an access key, allowing said data storage media to be placed in said logical library partition vault.

20. The system of claim 14, wherein said library controller is further configured to: only in response to said library controller verifying an access key, directing an accessor to move said one or more data storage media placed in said logical library partition vault.

21. The system of claim 14, further comprising at least one door to allow internal access to said automated data storage library and wherein said library controller is further configured to:
only in response to said library controller verifying an access key, allowing said door to be opened on said automated data storage library to permit access to said one or more data storage media placed in said logical library partition vault.

22. A library controller for controlling an automated data storage library, said library controller is configured to:
partition said automated data storage library into one or more logical libraries, wherein at least one of said one or more logical libraries is accessible by at least one host computer;
create a logical library partition vault in said automated data storage library that is not accessible by any host computer;
place one or more data storage media in said logical library partition vault; and
restrict access to said logical library partition vault.

23. The library controller of claim 22, further comprising one or more cartridge maps for associating data storage media with said logical library partition vault and wherein said library controller is further configured to:
assign said one or more cartridge maps to said logical library partition vault.

24. The library controller of claim 22, further comprising a plurality of storage shelves for storing data storage media and wherein said library controller is further configured to:
assign one or more of said storage shelves to said logical library partition vault.

25. The library controller of claim 22, further comprising one or more data storage drives and wherein said library controller is further configured to:
assign said one or more data storage drives to said logical library partition vault.

26. The library controller of claim 22, further comprising one or more input/output stations and wherein said library controller is further configured to:
assign said one or more input/output stations to said logical library partition vault.

27. The library controller of claim 22, further comprising at least one accessor, wherein said library controller is further configured to:
only in response to said library controller verifying an access key, directing said at least one accessor to move said one or more data storage media placed in said logical library partition vault.

28. The library controller of claim 22, further comprising at least one door to allow internal access to said automated data storage library and wherein said library controller is further configured to:
only in response to said library controller verifying an access key, allowing said door to be opened on said automated data storage library to permit access to said one or more data storage media placed in said logical library partition vault.

29. An article of manufacture comprising a data storage medium tangibly embodying a program of machine-readable instructions executable by a digital processing apparatus to perform method steps for managing data storage media in an automated data storage library, comprising:

partitioning said automated data storage library into one or more logical libraries, wherein at least one of said one or more logical libraries is accessible by at least one host computer;

creating a logical library partition vault in said automated data storage library that is not accessible by any host computer;

placing one or more of said data storage media in said logical library partition vault; and restricting access to said logical library partition vault.

30. The article of manufacture of claim 29, where the creating step further comprises:

assigning one or more cartridge maps to said logical library partition vault.

31. The article of manufacture of claim 29, where the creating step further comprises:

assigning one or more storage shelves to said logical library partition vault.

32. The article of manufacture of claim 29, where the creating step further comprises:

assigning a service bay to said logical library partition vault.

33. The article of manufacture of claim 29, where the creating step further comprises:

assigning one or more data storage drives to said logical library partition vault.

34. The article of manufacture of claim 29, where the creating step further comprises:

assigning one or more data storage drives to said logical library partition vault;

placing at least one of said one or more data storage media in at least one of said one or more data storage drives; and ejecting said at least one of said one or more data storage media from said at least one of said one or more data storage drives only if secure access to said one or more data storage drives is verified.

35. The article of manufacture of claim 29, where the creating step further comprises:

assigning one or more reduced function data storage drives to said logical library partition vault.

36. The article of manufacture of claim 29, where the creating step further comprises:

assigning one or more input/output stations to said logical library partition vault.

37. The article of manufacture of claim 29, where the placing step further comprises:

only in response to a library controller verifying an access key, allowing said data storage media to be placed in said logical library partition vault.

38. The article of manufacture of claim 29, where the restricting step further comprises:

preventing any host computer from directing an accessor to move said data storage media placed in said logical library partition vault.

39. The article of manufacture of claim 29, where the restricting step further comprises:

only in response to a library controller verifying an access key, directing an accessor to move said one or more data storage media placed in said logical library partition vault.

40. The article of manufacture of claim 29, where the restricting step further comprises:

only in response to a library controller verifying an access key, allowing a door to be opened on said automated data storage library to permit access to said one or more data storage media placed in said logical library partition vault.

* * * * *